United States Patent [19]

Crooke et al.

[11] 4,332,753

[45] Jun. 1, 1982

[54] POROUS REFRACTORY MATERIALS

[75] Inventors: Peter A. Crooke, Mackworth; Kenneth Gallimore, Derby, both of England

[73] Assignee: Rolls-Royce Limited, London, England

[21] Appl. No.: 233,371

[22] Filed: Feb. 11, 1981

[30] Foreign Application Priority Data

Apr. 16, 1980 [GB] United Kingdom ................. 8012483

[51] Int. Cl.$^3$ ............................................... B29J 1/00
[52] U.S. Cl. ...................................... 264/44; 264/57; 264/59
[58] Field of Search ............................. 264/57, 59, 44

[56] References Cited

U.S. PATENT DOCUMENTS

| 3,090,094 | 5/1963 | Schwartzwalder | 264/59 |
| 3,097,930 | 7/1963 | Holland | 264/59 |
| 3,958,924 | 5/1976 | Egenolf | 264/57 |
| 4,102,961 | 7/1978 | Cremer | 264/57 |
| 4,174,950 | 11/1979 | Jalbert | 264/57 |
| 4,184,840 | 1/1980 | Gamberg | 264/57 |
| 4,256,498 | 3/1981 | Köhler | 264/57 |

Primary Examiner—James H. Derrington
Attorney, Agent, or Firm—Cushman, Darby & Cushman

[57] ABSTRACT

A method of making a porous refractory shape comprises impregnating a sponge with a refractory material carried in a suspension, evaporating the suspension, placing the impregnated sponge on a plurality of rolling elements carried by a support base and firing the supported shape in a kiln.

4 Claims, 2 Drawing Figures

POROUS REFRACTORY MATERIALS

This invention relates to porous refractory shapes and their manufacture from refractory material such as refractory clays, minerals, oxides, borides, carbides, nitrides, silicides and the like and mixtures thereof.

It is known to make porous refractory shapes by impregnating a shaped sponge of the intercommunicating cell type with a suspension or dispersion of refractory particles in a liquid then squeezing the sponge to remove excessive amounts of liquid and subsequently allowing it to dry. The dried sponge is then heated to remove the remaining liquid and the materials of the sponge and to sinter the refractory particles together.

However this system suffers a disadvantage, particularly in the case of porous refractory materials of relatively large area in that during the heating stage of the manufacturing process they are prone to cracking. This is believed to be due to the fact that the porous refractory shapes are placed upon a refractory tile which may consist of a silicon nitride plate which is then loaded into a furnace. Such a tile may not necessarily be manufactured from silicon nitride as any refractory material may be used which is dimensionally stable at the firing temperature, which is not prone to thermal shock and which is non-reactive with the porous ceramic being fired. During the heating process the porous ceramic goes through a stage where it has little mechanical strength. As the temperature rises sintering takes place and mechanical strength is developed. Also as the porous ceramic is fired considerable shrinkage takes place, and at the same time the refractory supporting tile expands, the combination of these two features therefore leads to tearing or cracking of the porous ceramic.

Various methods in the ceramic art exist for overcoming this type of defect, for example firing the porous ceramic on a smooth inclined refractory tile. This allows gravity to assist the natural tendency to contract by partially overcoming friction. Because porous ceramic of the type described is so light in weight and the angle of inclination of the refractory tile is excessive, this makes loading the kiln difficult and uneconomical. Alternatively porous ceramic objects, can be fired on a bed of loose sand sized refractory particles. With porous ceramic objects the loose sand support tends to penetrate the pores and contaminate the cellular structure.

The object of the present invention is to provide means to substantially overcome the aforementioned problem.

According to the present invention a method of making a porous refractory shape comprises impregnating a shaped sponge of the intercommunicating cell type with a suspension or dispersion of refractory particles in a liquid, squeezing the sponge to remove excess liquid, air drying the sponge to remove further liquid, supporting the air dried sponge from a supporting base by means of a plurality of supporting elements, placing the assembly of supporting base, the plurality of supporting elements and sponge within a furnace, and subsequently heating the assembly to remove the remaining liquid and the material of the sponge and to sinter the refractory particles together.

Preferably the supporting base comprises a silicon carbide tile, and the plurality of supporting elements comprise refractory rolling elements which may comprise either balls or rollers.

For better understanding of the invention an embodiment thereof will now be more particularly described by way of example only, and as illustrated in the accompanying drawings in which.

Figure 1:
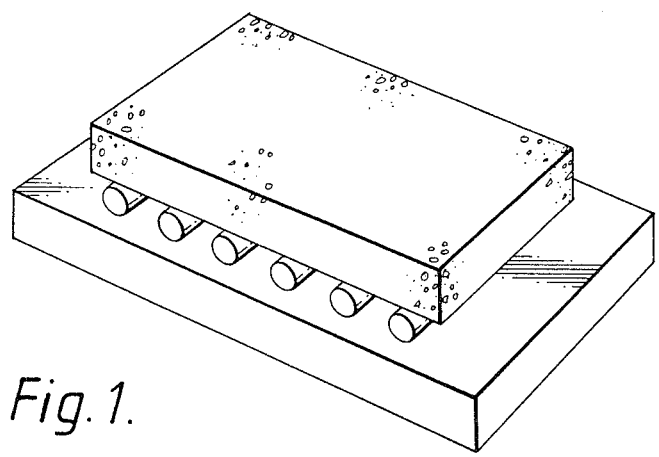
FIG. 1 shows a pictorial view of a porous refractory shape supported upon a plurality of rollers.
Figure 2:
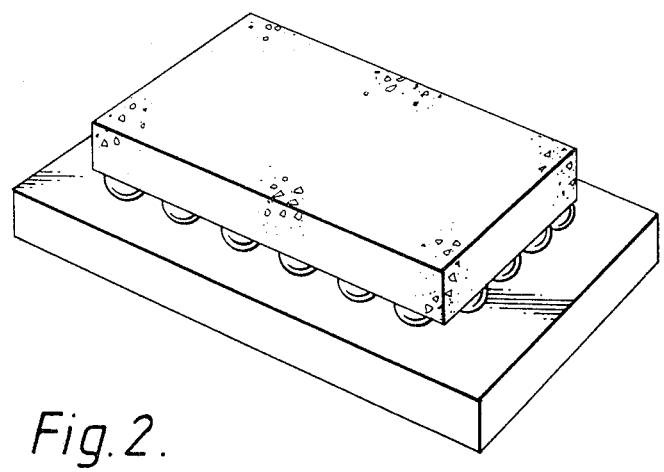
FIG. 2 shows a pictorial view of a porous refractory shape supported upon a plurality of balls.

A method of making a porous refractory shape consists of producing a sponge material of the required shape of finished body. The sponge may be of any material which can be suitably removed by heating in an inert atmosphere where it breaks down and its products so formed are volatilized or burned off. A suitable sponge may be manufactured from polystyrene, polyethylene, polyvinyl chloride, latex or polyurethane.

The sponge is then impregnated with a suitable dispersion or suspension of refractory particles in a liquid. Such refractory particles may consist of refractory clays, minerals, oxides, borides, carbides, silicides, nitrides and the like and mixtures thereof, together with additives such as clay, calcium, phosphate, wepheline syanite and other elements producing temporary and permanent bonds and imparting desirable properties such as thixotrophy, wetting ability and mould resistance to the ceramic paste.

To impregnate the shaped sponge it may be compressed to exclude a certain amount of air and is immersed in a suspension or dispersion of the required refractory material. The shaped sponge is allowed to regain its original shape whilst immersed in the suspension or dispersion thereby absorbing a certain amount of the suspension or dispersion. The sponge may then be further compressed and allowed to expand in order to completely fill the voids in the sponge with the suspension or dispersion.

Thereafter the sponge may be again compressed to remove a predetermined quantity or suspension or dispersion. The shape may then be dried to deposit the refractory material throughout the shaped sponge.

The dried sponge is then placed upon a plurality of refractory supporting elements which are in turn carried by a supporting base. The plurality of refractory supporting elements may comprise either balls or rollers which may be made from any suitable refractory material which is capable of withstanding the temperature to which they will ultimately be subjected to within a furnace. The supporting base may consist of a flat plate of silicon carbide or material having similar properties without warping. Such a material is chosen because of its ability to withstand the repeated changes in temperature to which it is subjected when used repeatedly within a furnace.

After being placed upon the plurality of refractory supporting elements the sponge is placed within a furnace where it is heated sufficiently to remove the remaining liquid and the materials of the sponge and sinter the refractory particles together. It will be appreciated that when the sponge is heated within the furnace its rate of expansion or contraction is, or may be different to the supporting base upon which it is carried however due to the provision of the refractory supporting elements the sponge may expand or contract without being restrained by the supporting base and therefore cracking of the sponge is substantially eliminated.

Such a completed porous refractory material is particularly suitable for use as a filter for molten metals, hot gases and aggressive chemical liquids of various temperatures or alternatively as a heat insulating or sound absorbent material. However such a material is in no way restricted to such use.

We claim:

1. A method of making a porous refractory shape comprising the steps of: impregnating a shaped sponge having pores and a cellular structure with a suspension or dispersion of refractory particles in a liquid; squeezing the sponge to remove excess liquid therefrom; air drying the sponge to remove further liquid therefrom; providing a plate-like supporting base made of a refractory material capable of withstanding repeated changes in temperature with a plurality of individually movable supporting rolling elements on the plate-like supporting base upper surface whereby said rolling elements do not penetrate the pores and contaminate the cellular structure of the sponge and said rolling elements being made from a refractory material capable of withstanding a temperature to which the rolling elements are to be subjected; positioning the air dried sponge on top of the plurality of rolling elements supported on the supporting base to define an assembly; then placing the assembly of the supporting base, the rolling elements on the upper surface, and the air dried sponge supported on the rolling elements within a furnace; and subsequently heating the assembly to a temperature to remove the remaining liquid and the material of the sponge and to further sinter the particles together as the porous refractory shape without development of cracks due to differential rates of expansion and contraction of the assembly.

2. A method of making a porous refractory shape as claimed in claim 1 in which the supporting base comprises a silicon carbide tile.

3. A method of making a porous refractory shape as claimed in claim 1 in which said plurality of rolling elements includes using balls.

4. A method of making a porous refractory shape as claimed in claim 1 in which said plurality of rolling elements includes using a plurality of individual rollers.

* * * * *